(12) United States Patent
Kim

(10) Patent No.: US 8,259,244 B2
(45) Date of Patent: Sep. 4, 2012

(54) DISPLAY SUBSTRATE AND METHOD OF MANUFACTURING THE SAME

(75) Inventor: In-Woo Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 477 days.

(21) Appl. No.: 12/187,078

(22) Filed: Aug. 6, 2008

(65) Prior Publication Data
US 2009/0180062 A1 Jul. 16, 2009

(30) Foreign Application Priority Data

Jan. 10, 2008 (KR) .................. 10-2008-0002871

(51) Int. Cl.
G02F 1/1368 (2006.01)
G02F 1/1343 (2006.01)
(52) U.S. Cl. ............ 349/39; 349/43; 349/106; 349/111; 349/143; 349/145; 349/187
(58) Field of Classification Search ............ 349/38, 349/39, 42, 43, 106, 110, 111, 138, 187, 349/143, 145; 257/59, 72; 438/30, 151, 438/155; 345/92
See application file for complete search history.

(56) References Cited

U.S. PATENT DOCUMENTS

| 4,600,274 | A * | 7/1986 | Morozumi | 349/109 |
| 6,337,731 | B1 * | 1/2002 | Takemura | 349/187 |
| 6,429,599 | B1 * | 8/2002 | Yokoyama | 313/504 |
| 6,654,073 | B1 * | 11/2003 | Maruyama et al. | 349/38 |
| 2004/0263745 | A1 * | 12/2004 | Lee et al. | 349/139 |
| 2005/0078252 | A1 * | 4/2005 | Lin | 349/139 |
| 2006/0125994 | A1 * | 6/2006 | Hoshino et al. | 349/149 |
| 2008/0192163 | A1 * | 8/2008 | Lee et al. | 349/46 |

FOREIGN PATENT DOCUMENTS

| JP | 10-339888 | 12/1998 |
| JP | 2003-186047 | 7/2003 |
| KR | 2006-0088017 | 8/2006 |

* cited by examiner

Primary Examiner — Dung Nguyen
Assistant Examiner — Tai Duong
(74) Attorney, Agent, or Firm — Innovation Counsel LLP

(57) ABSTRACT

A display substrate in accordance with one or more embodiments includes a first line pattern, a first insulation layer, a second line pattern, a color filter layer and a pixel electrode, which are formed on a substrate. The first line pattern includes a gate line and a light-blocking layer. The light-blocking layer has a first opening portion formed in a storage capacitor region. The first insulation layer is formed on the substrate having the first line pattern. The second line pattern is formed on the first insulation layer. The color filter layer is formed on the substrate having the second line pattern, and has a second opening portion overlapping with the storage electrode. The pixel electrode is formed on the substrate having the color filter layer. Thus, short circuits between the storage electrode and the pixel electrode may be prevented.

19 Claims, 6 Drawing Sheets 130 180 144 124 145  172 174  160 190    150 122  142 110 123 122
                      ‾‾‾‾‾
                       170

124                    122  110  123 122

DISPLAY SUBSTRATE AND METHOD OF MANUFACTURING THE SAME

CROSS-REFERENCE TO RELATED APPLICATIONS

This application claims priority to and benefit under 35 U.S.C. §119 to Korean Patent Application No. 2008-2871, filed on Jan. 10, 2008 in the Korean Intellectual Property Office (KIPO), the contents of which are herein incorporated by reference in their entirety.

BACKGROUND

1. Technical Field

The embodiments of the present invention relate to a display substrate and a method of manufacturing the display substrate. More particularly, the embodiments of the present invention relate to a display substrate that may be used for a display device displaying an image and a method of manufacturing the display substrate.

2. Description of the Related Art

In general, a liquid crystal display (LCD) apparatus includes a thin-film transistor (TFT) substrate, a color filter substrate facing the TFT substrate and a liquid crystal layer interposed between the TFT substrate and the color filter substrate.

The TFT substrate includes a signal line, a TFT, and a pixel electrode each formed on an insulation substrate to independently drive a plurality of pixels. The color filter substrate includes a color filter layer having a red color filter, a green color filter, a blue color filter, and a common electrode, etc.

Recently, research has been conducted on an LCD apparatus having a color filter on array (COA) structure, which includes a color filter layer formed on a TFT substrate.

The TFT substrate includes a storage capacitor formed by a data metal and a pixel electrode to maintain a pixel voltage applied to each pixel for a frame. A color filter layer corresponding to the storage capacitor is opened, and a light-blocking layer formed from substantially the same layer as a gate metal is formed under the storage capacitor.

In the above-mentioned structure, the thickness of an upper photoresist is reduced by the thickness of the light-blocking layer through a photolithography process for the data metal. Thus, when the data metal is etched, a portion of the data metal under a portion of the photoresist that is thin may be exposed to an etchant so that a surface of the data metal becomes rough. When the surface of the data metal becomes rough, the step coverage of a protective layer formed on the data metal may be deteriorated, thereby causing short circuits between the data metal and the pixel electrode.

SUMMARY

One or more embodiments of the present invention provide a display substrate capable of preventing short circuits between a data metal of a storage capacitor region and a pixel electrode.

One or more embodiments of the present invention also provide a method of manufacturing the above-mentioned display substrate.

In one aspect of the present invention in accordance with an embodiment, a display substrate includes a first line pattern, a first insulation layer, a second line pattern, a color filter layer, and a pixel electrode each formed on a substrate. The first line pattern includes a gate line and a light-blocking layer. The light-blocking layer has a first opening portion and is formed in a storage capacitor region. The first insulation layer is formed on the substrate having the first line pattern. The second line pattern is formed on the first insulation layer, and includes a data line crossing the gate line and a storage electrode formed on the light-blocking layer having the first opening portion. The color filter layer is formed on the substrate having the second line pattern, and has a second opening portion overlapping with the storage electrode. The pixel electrode is formed on the substrate having the color filter layer.

For example, the first opening portion may be larger than the second opening portion such that the entire second opening portion is overlapped with the first opening portion. The storage electrode may be smaller than the light-blocking layer and larger than the first opening portion.

The display substrate may further include an active pattern formed between the first insulation layer and the second line pattern, and may further include a second insulation layer formed between the second line pattern and the color filter layer, and may further include a third insulation layer formed between the color filter layer and the pixel electrode.

The width of the pixel electrode in a longitudinal direction of the data line may be less than the width of the pixel electrode in a longitudinal direction of the gate line. Furthermore, the display substrate may further include a plurality of thin-film transistors (TFTs) electrically connected to the data line and arranged to form a zigzag configuration in the longitudinal direction of the data line such that the data line is positioned between the TFTs.

In another aspect of the present invention in accordance with an embodiment, there is provided a method of manufacturing a display substrate. In the method, a first line pattern is formed on a substrate. The first line pattern includes a gate line and a light-blocking layer. The light-blocking layer has a first opening portion and being formed in a storage capacitor region. A first insulation layer is formed on the substrate having the first line pattern. A second line pattern is formed on the first insulation layer. The second line pattern includes a data line crossing the gate line and a storage electrode formed on the light-blocking layer having the first opening portion. A color filter layer is formed on the substrate having the second line pattern. The color filter layer has a second opening portion overlapping with the storage electrode. A pixel electrode is formed on the substrate having the color filter substrate. The first opening portion may be larger than the second opening portion such that the entire second opening portion is overlapped with the first opening portion. The storage electrode may be smaller than the light-blocking layer and larger than the first opening portion.

According to the above and in accordance with an embodiment, an opening portion is formed through a light-blocking layer formed under a storage capacitor to prevent a data metal under a photoresist from being exposed in an etching process of the data metal so that a surface of the data metal is prevented from being etched. Thus, a step coverage of a protective layer formed on the data metal may be improved, and short circuits between a pixel electrode formed on the protective layer and the data metal may be prevented.

BRIEF DESCRIPTION OF THE DRAWINGS

Various aspects of the subject matter described herein will become readily apparent by reference to the following detailed description when considered in conjunction with the accompanying drawings wherein.

DETAILED DESCRIPTION

Figure 1:
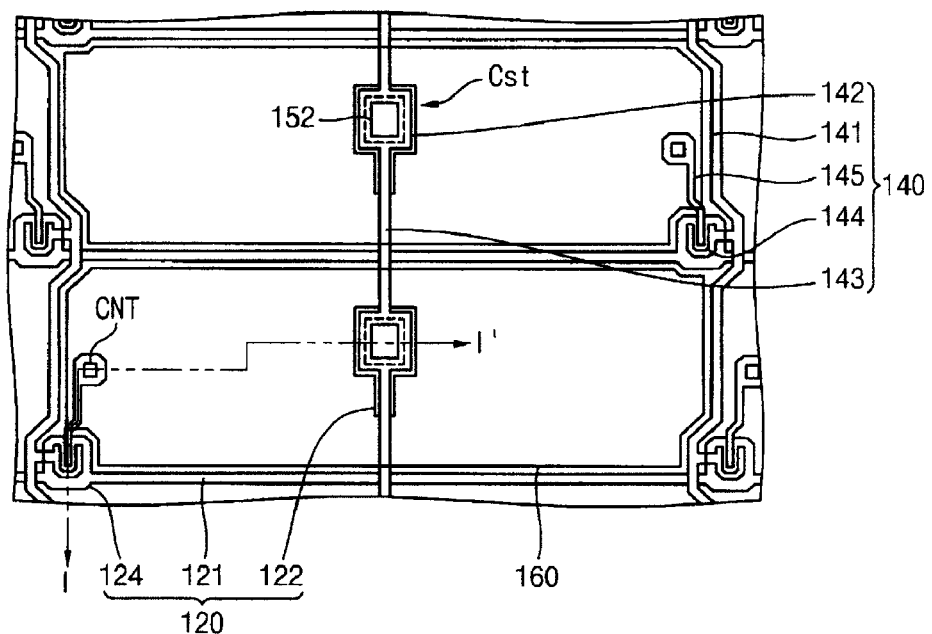
FIG. 1 is a plan view illustrating a display substrate according to one or more embodiments.

The subject matter is described more fully hereinafter with reference to the accompanying drawings, in which one or more embodiments are shown. However, the subject matter be embodied in many different forms and should not be construed as limited to the embodiments set forth herein. Rather, these embodiments are provided so that this disclosure will be thorough and complete, and will provide examples as to the scope of the subject matter to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the intended teachings.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the subject matter disclosed herein.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
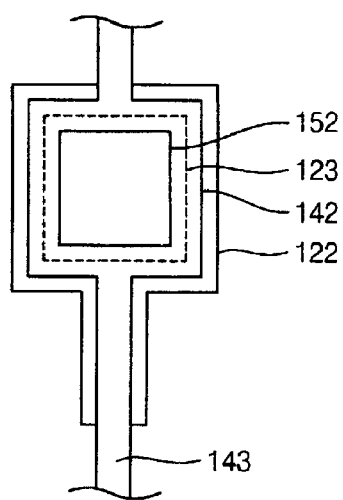
FIG. 2 is an enlarged view illustrating a storage capacitor of FIG. 1.
Figure 3:
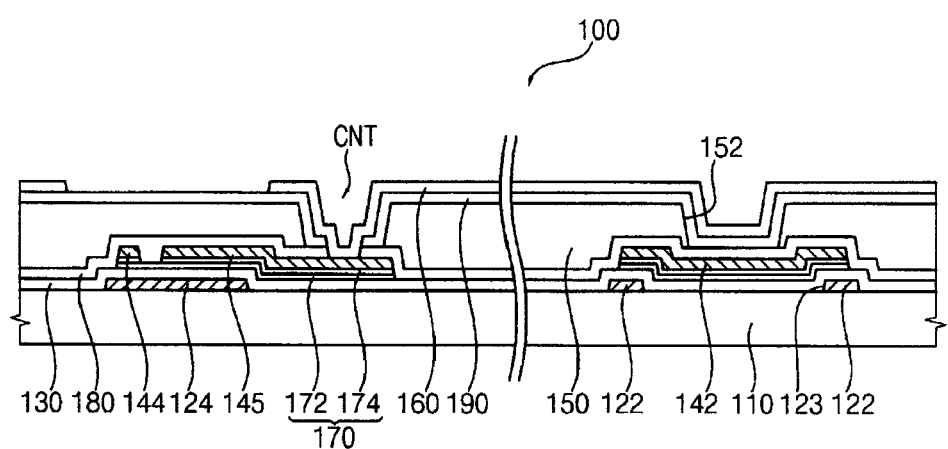
FIG. 3 is a cross-sectional view taken along the line I-I' of FIG. 1.

FIG. 1 is a plan view illustrating a display substrate according to one example embodiment. FIG. 2 is an enlarged view illustrating a storage capacitor of FIG. 1. FIG. 3 is a cross-sectional view taken along the line I-I' of FIG. 1.

Referring to FIGS. 1, 2 and 3, a display substrate 100 includes a substrate 110, a first line pattern 120, a first insulation layer 130, a second line pattern 140, a color filter layer 150 and a pixel electrode 160.

Examples of a material that may be used for the substrate 110 may include transparent glass, an organic resin, etc.

The first line pattern 120 is formed on the substrate 110. The first line pattern 120 includes a plurality of gate lines 121 and a light-blocking layer 122.

For example, the gate lines 121 may extend in a horizontal direction. The light-blocking layer 122 is formed between the gate lines 121. The light-blocking layer 122 is electrically separated from the gate lines 121, and has the shape of an island. The light-blocking layer 122 is substantially formed in an area corresponding to a storage capacitor Cst to prevent light from leaking at a peripheral region of the storage capacitor Cst. A first opening portion 123 is formed through the light-blocking layer 122. The first opening portion 123 will be fully described.

The first line pattern 120 may include a gate electrode 124 to form a thin-film transistor (TFT). The gate electrode 124 is electrically connected to the gate line 121 to receive a gate signal for driving the TFT.

For example, the first line pattern 120 may have a double-layer structure including a molybdenum layer and an aluminum layer, which are sequentially deposited. Alternatively, the first line pattern 120 may have a single-layer structure or a multilayer structure, and examples of a material that may be used for the first line pattern 120 may include aluminum (Al), molybdenum (Mo), neodymium (Nd), chromium (Cr), tantalum (Ta), titanium (Ti), tungsten (W), copper (Cu), silver (Ag), an alloy thereof, etc.

The first insulation layer 130 is formed on the substrate 110 having the first line pattern 120 to cover the first line pattern 120. Examples of a material that may be used for the first insulation layer 130 may include silicon nitride (SiNx), silicon oxide (SiOx), etc.

The second line pattern 140 is formed on the first insulation layer 130. The second line pattern 140 is connected to the first line pattern 120 through the first insulation layer 130. The second line pattern 140 includes a plurality of data lines 141 and a storage electrode 142.

The data lines 141 extend in a direction to cross the gate lines 121. For example, the data lines 141 may extend in a direction substantially perpendicular to the gate lines 121.

The storage electrode 142 is formed on the light-blocking layer 122 having the first opening portion 123. The storage electrode 142 may serve as a first electrode of the storage capacitor Cst. The storage electrode 142 is electrically connected to an adjacent storage electrode through a storage line 143. A first storage voltage is applied to the storage electrode 142 through the storage line 143.

The second line pattern 140 may further include a source electrode 144 and a drain electrode to form the TFT (an upper TFT). The source electrode 144 is electrically connected to the data line 141, and the drain electrode 145 is spaced apart from the source electrode 144 to form a channel of the upper TFT. The drain electrode 145 is electrically connected to a pixel electrode 160. As illustrated in FIG. 1, the upper TFT is located on a first side (e.g., the left side) with respect to the data line 141. The source electrode 144 is disposed on the first side (e.g., the left side) with respect to the data line 141. A TFT of a lower pixel (e.g., a lower TFT illustrated at the lower-right portion of FIG. 1) neighboring the upper pixel associated with the first TFT and located on a second side (e.g., the right side) with respect to the data line 141 is located on the second side with respect to the data line 141. The data line 141 has protruding patterns near the upper TFT and the lower TFT, respectively. The protruding patterns include a first protruding pattern disposed closer to the upper TFT than to the lower TFT, the first protruding pattern protruding on the second side (e.g., the right side) with respect to the data line 141. The protruding patterns further include a second protruding pattern disposed closer to the lower TFT than to the upper TFT, the second protruding pattern protruding on the first side (e.g., the second side) with respect to the data line 141.

Each pixel may have at least one TFT, and the TFT applies a data signal provided through the data line 141 to the pixel electrode 160 in response to a gate signal provided through the gate line 121.

For example, the second line pattern 140 may have a triple-layer structure including a lower molybdenum layer, an aluminum layer and an upper molybdenum layer, which are sequentially deposited. Alternatively, the second line pattern 140 may have a single-layer structure or a multilayer structure, and examples of a material that may be used for the second line pattern 140 may include aluminum (Al), molybdenum (Mo), neodymium (Nd), chromium (Cr), tantalum (Ta), titanium (Ti), tungsten (W), copper (Cu), silver (Ag), an alloy thereof, etc.

The display substrate 100 may further include an active pattern 170 formed between the first insulation layer 130 and the second line pattern 140. The active pattern 170 may include a semiconductor pattern 172 and an ohmic contact pattern 174. The semiconductor pattern 172 may serve as a channel through which a current passes. The ohmic contact pattern 174 may reduce the contact resistance of an interface between the semiconductor pattern 172 and the source electrode 144 and between the semiconductor pattern 172 and the drain electrode 145. For example, the semiconductor pattern 172 may include amorphous silicon (a-Si), and the ohmic contact pattern 174 may include amorphous silicon, into which n-type impurities are implanted at a high concentration ($n^+$ a-Si).

Since the second line pattern 140 and the active pattern 170 are patterned through the same process, a boundary of the active pattern 170 is substantially the same as a boundary of the second line pattern 140 when viewed from a plan view. Alternatively, the active pattern 170 may be formed to overlap with only the gate electrode 124.

A second insulation layer 180 may be formed on the substrate 110 having the second line pattern 140 to cover the second line pattern 140. Examples of a material that may be used for the second insulation layer 180 may include silicon nitride (SiNx), silicon oxide (SiOx), etc. The thickness of the second insulation layer 180 may be about 500 Å to about 2,000 Å.

A color filter layer 150 is formed on the substrate 110 having the second line pattern 140. The color filter layer 150 may be formed on the second insulation layer 180. The color filter layer 150 includes a red color filter, a green color filter and a blue color filter, which correspond to pixels. For example, the red, green and blue color filters respectively include a red pigment, a green pigment, and a blue pigment. The red, green and blue color filters may be formed on the second insulation layer 180 to form a predetermined pattern. For example, the red, green, and blue color filters may be arranged in a horizontal direction or a vertical direction so that one of the red, green, and blue color filters corresponds to one of the pixels.

The color filter layer 150 may be relatively thick so that the color filter layer 150 may planarize a surface of the display substrate 100. For example, the thickness of the color filter layer 150 may be about 2.5 μm to about 3.5 μm. When the thickness of the color filter layer is increased, an organic insulation layer of a conventional display substrate may be omitted to increase the transmittance and to reduce manufacturing costs.

A second opening portion 152 is formed through the color filter layer 150 to overlap with the storage electrode 142. Thus, the distance between the storage electrode 142 and the pixel electrode 160 is reduced, which increases the capacitance of the storage capacitor Cst.

A third insulation layer 190 is formed on the substrate 110 having the color filter layer 150. The third insulation layer 190 prevents harmful gas from flowing out from the color filter layer 150 including an organic material to prevent contamination of liquid crystal. The third insulation layer 190 may include an inorganic material to prevent the harmful gas from flowing out. For example, the third insulation layer 190 may include silicon nitride (SiNx), and the thickness of the insulation layer 190 may be about 500 Å to about 2,000 Å.

The pixel electrode 160 is formed on the substrate 100 having the color filter layer 150. The pixel electrode 150 may be formed on the third insulation layer 190. The pixel electrode 160 may be formed on the third insulation layer 190 to correspond to each pixel. The pixel electrode 160 may include a transparent conductive material, through which light may pass. Examples of a material that may be used for the pixel electrode 160 may include indium zinc oxide (IZO), indium tin oxide (ITO) and the like.

The pixel electrode 160 is electrically connected to the drain electrode 145 of the TFT. A contact hole CNT is formed through the second insulation layer 180, the color filter layer 150 and the third insulation layer 190. The pixel electrode 160 is electrically connected to the drain electrode 145 through the contact hole CNT.

The pixel electrode 160 overlaps with the storage electrode 142 in the second opening portion 152 such that the third insulation layer 190 and the second insulation layer 180 are disposed between the pixel electrode 160 and the storage electrode 142. The data signal applied to the pixel electrode 160 through the TFT is maintained for one frame by the storage capacitor Cst.

The pixel electrode 160 may have an opening pattern to divide the pixel P into a plurality of domains to improve the viewing angle of a display device. The pixel electrode 160 may include a main electrode and a sub-electrode, which respectively receive different voltages. When the pixel electrode 160 includes the main electrode and the sub-electrode, the pixel P may include two TFTs electrically connected to the main electrode and the sub-electrode, respectively.

The width of the pixel electrode 160 (or pixel P) in a longitudinal direction of the data line 141 may be less than the width of the pixel electrode 160 (or pixel P) in a longitudinal direction of the gate line 121. According to the above, the number of the data lines 141 is reduced. Thus, manufacturing costs for a data driving part (not shown) applying the data signal to the data lines 141 may be reduced.

The TFTs formed in the pixels P and electrically connected to the pixel electrodes 160 may be arranged to form a zigzag configuration in the longitudinal direction of the data line 141 such that the data line 141 is positioned between the TFTs. When the TFTs are arranged to form a zigzag configuration, dot inversion driving may be realized through a column inversion driving method.

In one embodiment, the storage capacitor Cst is formed by the storage electrode 142 and the pixel electrode 160. The storage electrode 142 is formed on the first insulation layer 130, and is formed from substantially the same layer as the second line pattern 140. The pixel electrode 160 overlaps with the storage electrode 142 such that the second and third insulation layers 180 and 190 are positioned between the pixel electrode 160 and the storage electrode 142. The light-blocking layer 122 having the first opening portion 123 is formed under the storage capacitor Cst to prevent light from leaking at a peripheral region of the storage electrode 142.

When the light-blocking layer 122 is formed to overlap with the entire storage electrode 142, the thickness of an upper photoresist is reduced by the thickness of the light-blocking layer 122 in a photolithography process of a metal layer for forming the second line pattern 140. Thus, when the metal layer is etched, the metal layer disposed where the thickness of the upper photoresist is relatively thin may be exposed and etched so that a surface of the storage electrode 142 becomes rough. Thus, the step coverage of the second insulation layer 180 and the third insulation layer 190 may be deteriorated thereby causing short circuits between the storage electrode 142 and the pixel electrode 160.

As illustrated in FIGS. 2 and 3, when the first opening portion 123 is formed through the light-blocking layer 122 under the storage capacitor Cst, the height of the storage electrode 142 is reduced by the thickness of the light-blocking layer 122. Thus, the thickness of the upper photoresist is increased. Thus, even if an ashing process of the upper photoresist is performed excessively, the surface of the storage electrode 142 may not be damaged since the upper photoresist is sufficiently thick. Accordingly, short circuits between the storage electrode 142 and the pixel electrode 160 may be prevented.

A portion of the storage electrode 142 disposed on the light-blocking layer 122 may be damaged. However, short circuits between the storage electrode 142 and the pixel electrode 160 may be prevented since a color filter layer 150 thicker than the second insulation layer 180 covers the storage electrode 142.

Thus, the first opening portion 123 of the light-blocking layer 122 may be preferably larger than the second opening portion 152 of the color filter layer 150 so that the first opening portion 123 may overlap with the entire second opening portion 152. Furthermore, the storage electrode 142 may be preferably larger than the first opening portion 123 and smaller than the light-blocking layer 122 so as to prevent light from leaking at a peripheral region of the storage electrode 142. For example, the light-blocking layer 122 may protrude from a boundary of the storage electrode 142 by about 2 μm to about 3 μm in a lateral direction.

Hereinafter, a method of manufacturing the display substrate illustrated in FIGS. 1 to 3 with reference to FIGS. 4 to 12.

FIGS. 4, 5, 6, 7, 8, 9, 10, 11 and 12 are cross-sectional views illustrating a method of manufacturing a display substrate according to one or more embodiments.

Figure 4:
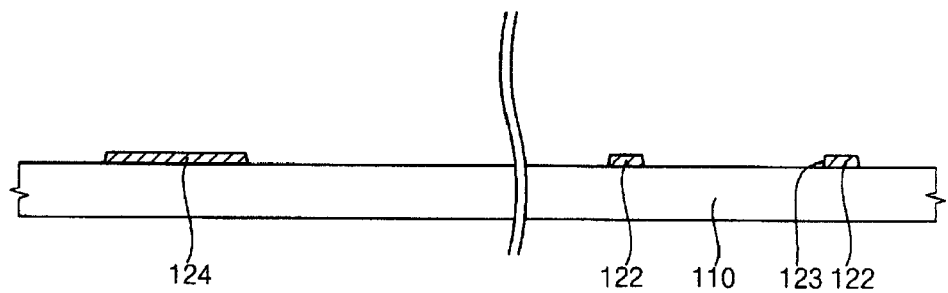
FIGS. 4, 5, 6, 7, 8, 9, 10, 11, and 12 are cross-sectional views illustrating a method of manufacturing a display substrate according to one or more embodiments.

Referring to FIGS. 1 and 4, after a metal layer is deposited on a substrate 110, the metal layer is patterned to form a first line pattern 120 including a gate line 121, a gate electrode 124 and a light-blocking layer 122 having a first opening portion 123.

The gate electrode 124 is electrically connected to the gate line 121. The light-blocking layer 122 is formed between the gate lines 121 in a storage capacitor Cst area, and is electrically separated from the gate line 121 and the gate electrode 124.

As explained above, the first opening portion 123 is formed through the light-blocking layer 122 so that a thickness of a photoresist may be increased in an etching process for a second line pattern 140 so as to prevent a storage electrode 142 from being damaged.

For example, the first line pattern 120 may have a double-layer structure including a molybdenum layer and an aluminum layer, which are sequentially deposited. Alternatively, the first line pattern 120 may have a single-layer structure or a multilayer structure, and examples of a material that may be used for the first line pattern 120 may include aluminum (Al), molybdenum (Mo), neodymium (Nd), chromium (Cr), tantalum (Ta), titanium (Ti), tungsten (W), copper (Cu), silver (Ag), an alloy thereof, etc.

Figure 5:
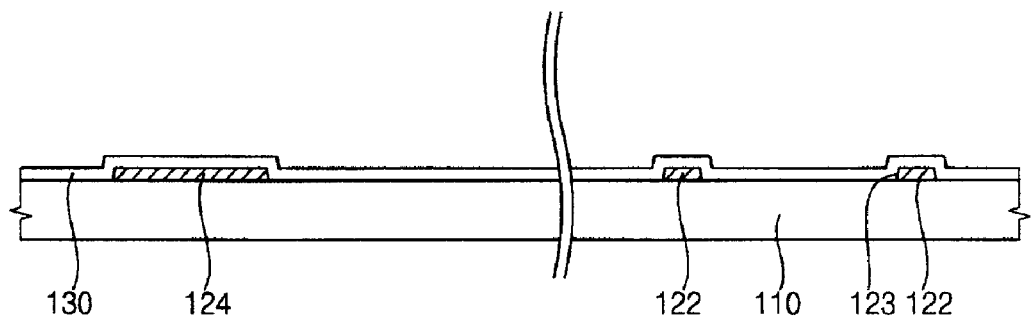

Referring to FIGS. 1 and 5, a first insulation layer 130 is formed on the substrate 110 having the first line pattern 120 to cover the first line pattern 120. Examples of a material that may be used for the first insulation layer 130 may include silicon nitride (SiNx), silicon oxide (SiOx), etc. The thickness of the first insulation layer 130 may be about 1,000 Å to about 5,000 Å.

Figure 6:
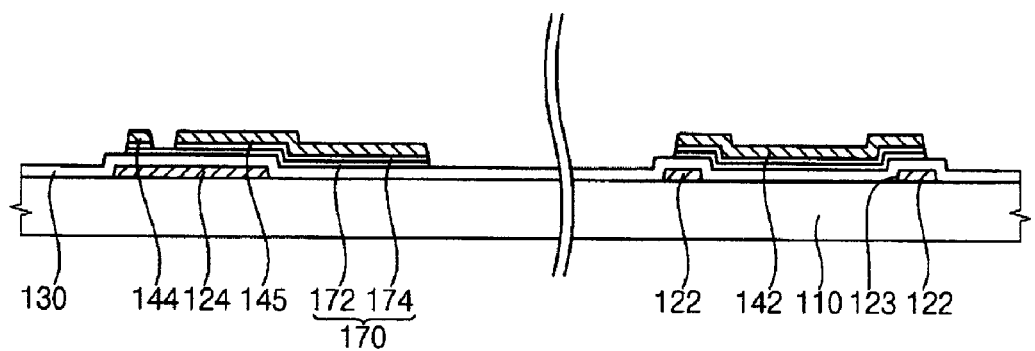

Referring to FIGS. 1 and 6, a second line pattern 140 is formed on the first insulation layer 130. The second line pattern 140 includes an active pattern 170, a data line 141, a source electrode 144, a drain electrode 145, and a storage electrode 142.

The source electrode 144 is electrically connected to the data line 141, and the drain electrode 145 is spaced apart from the source electrode 144 to form a channel of the TFT The storage electrode 142 is formed on the light-blocking layer 122 having the first opening portion 123 to form a storage capacitor Cst.

For example, the second line pattern 140 may have a triple-layer structure including a lower molybdenum layer, an aluminum layer and an upper molybdenum layer, which are sequentially deposited. Alternatively, the second line pattern 140 may have a single-layer structure or a multilayer structure, and examples of a material that may be used for the second line pattern 140 may include aluminum (Al), molybdenum (Mo), neodymium (Nd), chromium (Cr), tantalum (Ta), titanium (Ti), tungsten (W), copper (Cu), silver (Ag), an alloy thereof, etc.

The second line pattern 140 and the active pattern 170 may be patterned through the same process using one mask. When the second line pattern 140 and the active pattern 170 are patterned through the same process using one mask, a boundary of the active pattern 170 is substantially the same as a boundary of the second line pattern 140 when viewed from a plan view. The active pattern 170 is formed between the first insulation layer 130 and the second line pattern 140. Alternatively, the second line pattern 140 and the active pattern 170 may be patterned through separate processes respectively using different masks. When the second line pattern 140 and the active pattern 170 are patterned through separate processes respectively using different masks, the active pattern 170 may be formed to overlap with only the gate electrode 124.

The active pattern 170 may include a semiconductor pattern 172 and an ohmic contact pattern 174. For example, the semiconductor pattern 172 may include amorphous silicon (a-Si), and the ohmic contact pattern 174 may include amorphous silicon, into which n-type impurities are implanted at a high concentration ($n^+$ a-Si). A portion of the ohmic contact pattern 174 disposed between the source electrode 144 and the drain electrode 145 is removed to form a TFT FIGS. 7 to 10 are cross-sectional views illustrating a process of forming the active pattern and the second line pattern illustrated in FIG. 6 according to one embodiment.

Figure 7:
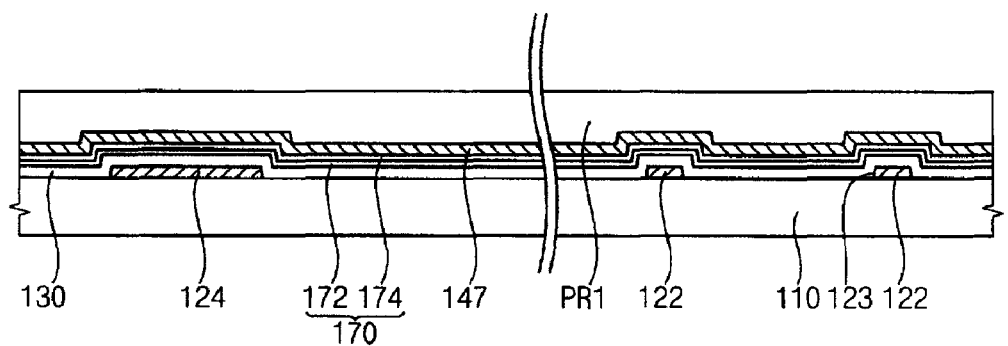

Referring to FIG. 7, an active layer 176 and a metal layer are sequentially formed on the substrate 110 having the first insulation layer 130. The active layer 176 includes a semiconductor layer 173 and an ohmic contact layer 175. The metal layer 147 is used for forming the second line pattern 140. Thereafter, a photoresist film PR1 is formed on the metal layer 147.

Figure 8:
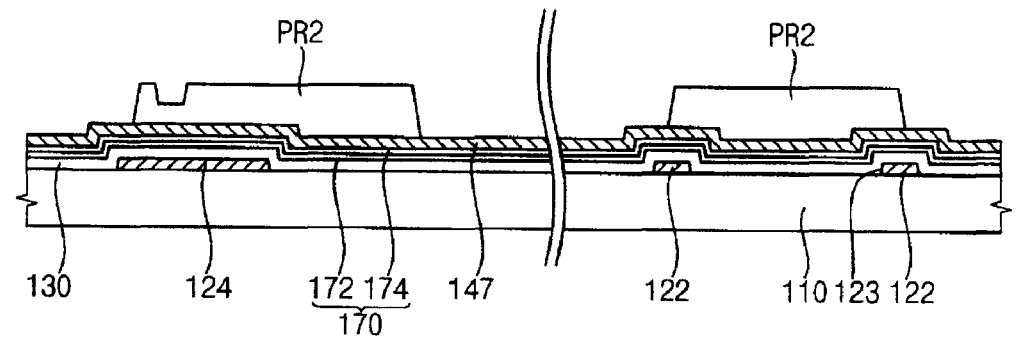

Referring to FIG. 8, the photoresist film PR1 is patterned through a photolithography process using a slit mask or a halftone mask to form a first photoresist pattern PR2. The first photoresist pattern PR2 has a first portion overlapping with the second line pattern 140 and having a first thickness and a second portion overlapping with a channel portion of the TFT and having a second thickness smaller than the first thickness.

Figure 9:
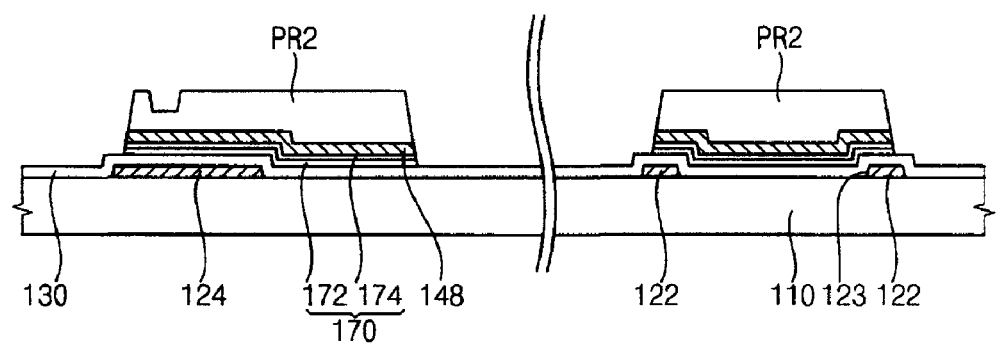

Referring to FIG. 9, the metal layer 147 is etched by using the first portion and the second portion of the first photoresist pattern PR2 as an etching mask to form a metal pattern layer 148. For example, the metal layer 147 may be patterned through a wet-etching process. Alternatively, the metal layer 147 may be patterned through a dry-etching process. Thereafter, the active layer 176 is patterned by using the first portion and the second portion of the first photoresist pattern PR2 as an etching mask so as to form an active pattern layer 179 including a semiconductor pattern layer 177 and an ohmic contact pattern layer 178.

Figure 10:
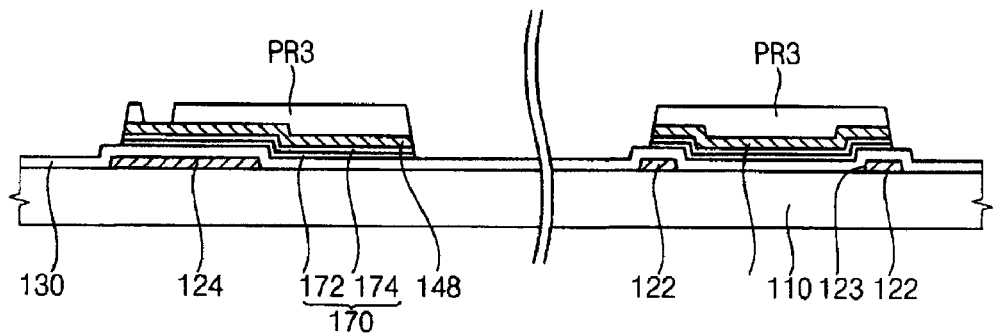

Referring to FIG. 10, an ashing process for reducing the thickness of the first photoresist pattern PR2 is performed to form a second photoresist pattern PR3. Thus, the channel portion of the TFT is exposed, and the second photoresist pattern PR3 is formed in a region corresponding to only the second line pattern 140.

Referring to FIGS. 6 and 10, a channel region of the metal pattern layer 148 is etched by using the second photoresist pattern PR3 as an etching mask to form the second line pattern 140. For example, the metal pattern layer 148 may be etched through a dry-etching process. The storage electrode 142 may be larger than the first opening portion 123 and smaller than the light-blocking layer 122.

Thereafter, a portion of the ohmic contact pattern layer 178 corresponding to the channel portion of the TFT and disposed between the source electrode 144 and the drain electrode 145 is etched to form the active pattern 170. Thereafter, the second photoresist pattern PR3 is removed.

Since the first opening portion 123 is formed through the light-blocking layer 122 under the storage electrode 142, the height of the storage electrode 142 corresponding to the first opening portion 123 is reduced by the thickness of the light-blocking layer 122. Thus, the thickness of the second photoresist pattern PR3 is increased by the thickness of the light-blocking layer 122. Thus, even if an ashing process of the first photoresist pattern PR2 is performed excessively, the surface of the storage electrode 142 may not be damaged since the second photoresist pattern PR3 is sufficiently thick.

Figure 11:
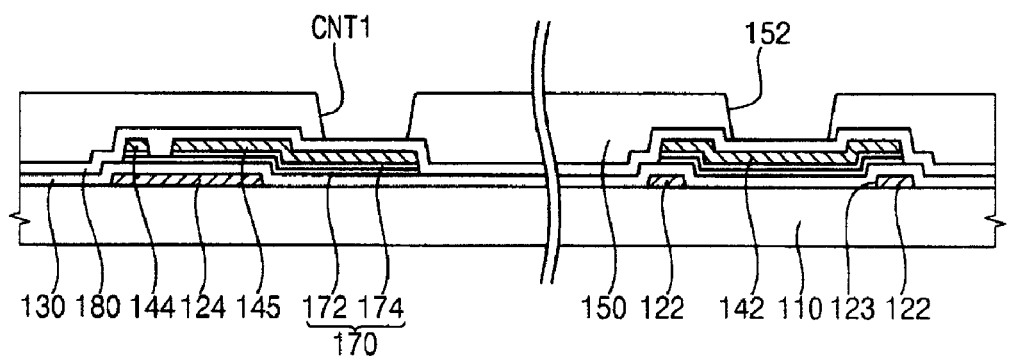

Referring to FIGS. 1 and 11, the second insulation layer 180 is formed on the substrate 110 to cover the second line pattern 140. Examples of a material that may be used for the second insulation layer 180 may include silicon nitride (SiNx), silicon oxide (SiOx), etc. The thickness of the second insulation layer 180 may be about 500 Å to about 2,000 Å.

Thereafter, the color filter layer 150 is formed on the second insulation layer 180. The color filter layer 150 may include a red color filter, a green color filter, and a blue color filter. The red, green, and blue color filters are formed to correspond to pixels.

The second opening portion 152 and a first contact hole CNT1 are formed through each of the red, green and blue color filters. The second opening portion 152 is formed on the storage electrode 142. The second opening portion 152 may be smaller than the first opening portion 123 of the light-blocking layer 122 so that the entire second opening portion 152 may be overlapped with the first opening portion 123 when viewed from a plan view.

A portion of the storage electrode 142 disposed on the light-blocking layer 122 may be damaged through a dry-etching process. However, short circuits between the storage electrode 142 and the pixel electrode 160 may be prevented since the color filter layer 150 is thicker than the second insulation layer 180 that covers the storage electrode 142.

Figure 12:
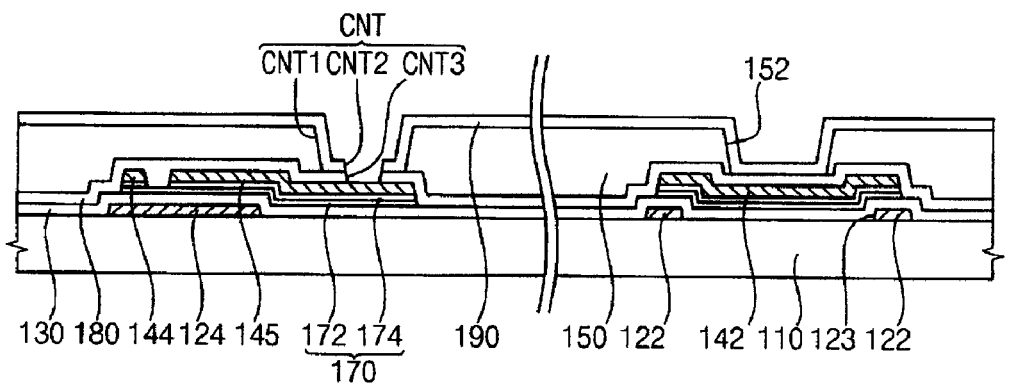

Referring to FIGS. 1 and 12, an inorganic layer is formed on the color filter layer 150 having the second opening portion 152 and the first contact hole CNT1, and then patterned to form a third insulation layer 190 having a second contact hole CNT2. The third insulation layer 190 may prevent harmful gas from flowing out from the color filter layer 150. For example, the third insulation layer 190 may include silicon nitride (SiNx), and the thickness of the insulation layer 190 may be about 500 Å to about 2,000 Å.

Thereafter, a third contact hole CNT3 is formed through the second insulation layer 180 to expose a portion of the drain electrode 145. When the second and third insulation layers 180 and 190 include substantially the same material, for example, silicon nitride, the second and third contact holes CNT2 and CNT3 are formed through the same process. Accordingly, the first to third contact holes CNT1, CNT2 and CNT3 form a contact hole CNT exposing a portion of the drain electrode 145.

Referring to FIGS. 1 and 3, a transparent conductive layer is formed on the third insulation layer 190, and then patterned to form the pixel electrode 160. Examples of a material that may be used for the pixel electrode 160 may include indium zinc oxide (IZO), indium tin oxide (ITO) and the like. The thickness of the pixel electrode 160 may be about 500 Å to about 600 Å.

The pixel electrode 160 is electrically connected to the drain electrode 145 through the contact hole CNT. Furthermore, the pixel electrode 160 overlaps with the storage electrode 142 to form the storage capacitor Cst such that the second and third insulation layers 180 and 190 are disposed between the pixel electrode 160 and the storage electrode 142.

As above, when the first opening portion 123 is formed through the light-blocking layer 122 under the storage capacitor Cst, the thickness of the second photoresist pattern PR3 is increased by the thickness of the light-blocking layer 122 in a dry-etching process for forming the second line pattern 140. Thus, even if the ashing process of the second photoresist pattern PR3 is performed excessively, the surface of the storage electrode 142 may not be damaged. Thus, the step coverage of the second and third insulation layers 180 and 190 may be improved, and short circuits between the pixel electrode 160 formed on the third insulation layer 190 and the storage electrode 142 may be prevented.

Although the various embodiments have been described, it is understood that the present invention should not be limited to these embodiments but various changes and modifications can be made by one ordinary skilled in the art within the spirit and scope of the present invention as hereinafter claimed.

What is claimed is:

1. A thin film transistor substrate comprising a plurality of pixels arrayed in a matrix and having:
    a gate line extending in a first direction;
    a data line intersecting the gate line in a second direction;
    a plurality of thin film transistors each comprising a gate electrode, a source electrode, and a drain electrode; and
    a pixel electrode electrically connected to the drain electrode,
    wherein a first thin film transistor of an upper pixel is located on a first side with respect to the data line, the first thin film transistor including a first source electrode disposed on the first side with respect to the data line, and a second thin film transistor of a lower pixel neighboring the upper pixel and located on a second side with respect to the data line is located on the second side with respect to the data line, and the data line has protruding patterns near the first and second thin film transistors, respectively, the protruding patterns including a first protruding pattern disposed closer to the first thin film transistor than to the second thin film transistor, the first protruding pattern protruding on the second side with respect to the data line.

2. The thin film transistor substrate of claim 1, wherein a width of the pixel electrode in the second direction is less than a width of the pixel electrode in the first direction.

3. The thin film transistor substrate of claim 2, wherein the protruding patterns further include a second protruding pattern disposed closer to the second thin film transistor than to the first thin film transistor, and wherein the second protruding pattern protrudes on the first side with respect to the data line.

4. The thin film transistor substrate of claim 1, wherein the protruding patterns further include a second protruding pattern disposed closer to the second thin film transistor than to the first thin film transistor, and wherein the second protruding pattern protrudes on the first side with respect to the data line.

5. The thin film transistor substrate of claim 4, wherein a width of the pixel in the second direction is less than a width of the pixel in the first direction.

6. A display substrate comprising:
    a first line pattern being formed on a substrate and including a gate line and a light-blocking layer, the light-blocking layer having a first opening portion formed in a storage capacitor region;
    a first insulation layer formed on the substrate having the first line pattern;
    a second line pattern formed on the first insulation layer, the second line pattern including a data line crossing the gate line and a storage electrode formed on the light-blocking layer having the first opening portion;
    a second insulation layer formed on the second line pattern;
    a color filter layer formed on the substrate having the second insulation layer, the color filter layer having a second opening portion overlapping with the storage electrode;
    a third insulation layer formed on the second insulation layer and the color filter layer, and being thinner than the color filer layer; and
    a pixel electrode formed on the substrate having the third insulation layer,
    wherein a portion of the third insulation layer is disposed inside the second opening portion, is disposed under a bottom portion of the pixel electrode, and is disposed between the storage electrode and the bottom portion of the pixel electrode, the bottom portion of the pixel electrode being insulated from the storage electrode by at least the portion of the third insulation layer.

7. The display substrate of claim 6, wherein the first opening portion is larger than the second opening portion such that the entire second opening portion is overlapped with the first opening portion.

8. The display substrate of claim 7, wherein the storage electrode is smaller than the light-blocking layer and larger than the first opening portion.

9. The display substrate of claim 8, further comprising an active pattern formed between the first insulation layer and the second line pattern.

10. The display substrate of claim 6, wherein a portion of the second insulation layer contacts the portion of the third insulation portion and is disposed under the bottom portion of the pixel electrode, the bottom portion of the pixel electrode being further insulated from the storage electrode by at least the portion of the second insulation layer.

11. The display substrate of claim 6, wherein the portion of the third insulation layer contacts a bottom surface of the bottom portion of the pixel electrode.

12. The display substrate of claim 6, wherein the width of the pixel electrode in a longitudinal direction of the data line is less than the width of the pixel electrode in a longitudinal direction of the gate line.

13. The display substrate of claim 12, further comprising a plurality of thin-film transistors (TFTs) electrically connected to the data line and arranged to form a zigzag configuration in the longitudinal direction of the data line such that the data line is positioned between the TFTs.

14. A method of manufacturing a display substrate, the method comprising:
    forming a first line pattern on a substrate, the first line pattern including a gate line and a light-blocking layer, the light-blocking layer having a first opening portion formed in a storage capacitor region;
    forming a first insulation layer on the substrate having the first line pattern;

forming a second line pattern on the first insulation layer, the second line pattern including a data line crossing the gate line and a storage electrode formed on the light-blocking layer having the first opening portion;

forming a second insulation layer on the second line pattern;

forming a color filter layer on the substrate having the second insulation layer, the color filter layer having a second opening portion overlapping with the storage electrode; forming a third insulation layer on the second insulation and the color filter layer, the third insulation layer being thinner than the color filter layer; and forming a pixel electrode on the substrate having the third insulation layer, wherein a portion of the third insulation layer is disposed inside the second opening portion, is disposed under a bottom portion of the pixel electrode, and is disposed between the storage electrode and the bottom portion of the pixel electrode, the bottom portion of the pixel electrode being insulated from the storage electrode by at least the portion of the third insulation layer.

15. The method of claim 14, wherein the first opening portion is larger than the second opening portion such that the entire second opening portion is overlapped with the first opening portion.

16. The method of claim 15, wherein the storage electrode is smaller than the light-blocking layer and larger than the first opening portion.

17. The method of claim 14, further comprising forming an active pattern between the first insulation layer and the second line pattern.

18. The method of claim 17, wherein the second line pattern and the active pattern are patterned through the same process.

19. The method of claim 14, wherein the width of the pixel electrode in a longitudinal direction of the data line is less than the width of the pixel electrode in a longitudinal direction of the gate line.

* * * * *